United States Patent
Le Gonidec et al.

(10) Patent No.: US 10,234,316 B2
(45) Date of Patent: Mar. 19, 2019

(54) METHOD AND SYSTEM FOR EVALUATING A FLOW RATE OF A FLUID

(71) Applicant: SAFRAN AIRCRAFT ENGINES, Paris (FR)

(72) Inventors: Serge Le Gonidec, Vernon (FR); Antoine Romet, Igoville (FR); Tarek Madani, Chaville (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 8 days.

(21) Appl. No.: 15/315,554

(22) PCT Filed: Jun. 2, 2015

(86) PCT No.: PCT/FR2015/051444
§ 371 (c)(1),
(2) Date: Dec. 1, 2016

(87) PCT Pub. No.: WO2015/185842
PCT Pub. Date: Dec. 10, 2015

(65) Prior Publication Data
US 2017/0205266 A1     Jul. 20, 2017

(30) Foreign Application Priority Data

Jun. 3, 2014  (FR) ...................... 14 55024

(51) Int. Cl.
*G01F 9/00* (2006.01)
*G01F 23/00* (2006.01)

(52) U.S. Cl.
CPC .............. *G01F 9/001* (2013.01); *G01F 9/005* (2013.01); *G01F 23/0069* (2013.01)

(58) Field of Classification Search
CPC ....................... G01F 9/001; G01F 9/00; G01F 15/001–15/002; G01F 23/0069; G01F 23/0076; G01F 23/0092
See application file for complete search history.

(56) References Cited

U.S. PATENT DOCUMENTS

2003/0046991 A1   3/2003  Masson et al.
2005/0043905 A1   2/2005  Vary
(Continued)

FOREIGN PATENT DOCUMENTS

CN        101932918 A       12/2010
EP        1 510 795 A2       3/2005
(Continued)

OTHER PUBLICATIONS

FR 2965305 (English translate), Mar. 30, 2012, 6 pp.*
(Continued)

*Primary Examiner* — Toan Le
(74) *Attorney, Agent, or Firm* — Oblon, McClelland, Maier & Neustadt, L.L.P.

(57) ABSTRACT

An evaluation system for evaluating a flow rate of a fluid coming from a tank, the system including measurement device suitable for measuring a fluid level in the tank and including estimation device for estimating the flow rate of the fluid using an unscented Kalman filter, the estimation device including an obtaining device for obtaining the raw fluid flow rate and correction device connected to the obtaining device and to the measurement device and configured to correct the raw flow rate as obtained by the obtaining device as a function of the level measured by the measurement device. A method performed by such a system.

15 Claims, 4 Drawing Sheets

(56) References Cited

U.S. PATENT DOCUMENTS

2012/0150517 A1 6/2012 Ray et al.
2013/0247542 A1 9/2013 Le Gonidec
2013/0311157 A1 11/2013 Ray et al.
2014/0174054 A1 6/2014 Kernilis et al.
2015/0248375 A1 9/2015 Houel et al.

FOREIGN PATENT DOCUMENTS

FR        2 965 305 A1   3/2012
FR        2 996 302 A1   4/2014
WO   2012/156615 A2   11/2012

OTHER PUBLICATIONS

Shijoh et al., Development of Nonlinear Model and Performance Evaluation of Model Based Controller and Estimator for the Efficient Control of Three-Tank Hybrid System, Oct. 2012, International Journal of Computer Applications (0975-8887), vol. 56, No. 12, pp. 11-16.*

International Search Report dated Sep. 14, 2015 in PCT/FR2015/051444 filed Jun. 2, 2015.

Chinese Office Action issued in Chinese Patent Application No. 201580029797.0 dated Nov. 30, 2018, (w/ English Translation).

* cited by examiner

METHOD AND SYSTEM FOR EVALUATING A FLOW RATE OF A FLUID

FIELD OF THE INVENTION

The present description relates to a method of evaluating a fluid flow rate coming from a tank, and more particularly it relates to making such a method reliable. The description also relates to a system enabling the method to be performed.

TECHNOLOGICAL BACKGROUND

A known evaluation method for evaluating a flow rate of a fluid coming from a tank comprises measuring a level of the fluid in the tank. In simple circumstances, e.g. assuming that the level measurement is continuously available, that the tank is cylindrical in shape, and that fluid does not accumulate anywhere between the outlet from the tank and the point at which the flow rate is evaluated, then the fluid flow rate can be evaluated with certainty merely by using an affine function.

Nevertheless, in practice, the measurement of the fluid level is rarely continuously available, which means that it is necessary to make use of interpolations or of estimators during periods when the level measurement is unavailable. However, uncertainties and biases can exist in association with level measurements and/or with the estimators used. Furthermore, the tank may be of non-cylindrical shape, thereby introducing nonlinearity into the evaluation function. There therefore exists a need for a novel type of method of evaluating a flow rate.

SUMMARY OF THE INVENTION

The present description relates to an evaluation method for evaluating a flow rate of a fluid coming from a tank, the method comprising measuring a level of the fluid in the tank and being characterized in that it comprises an estimation step for estimating the flow rate of the fluid by using an unscented Kalman filter, said estimation step comprising an obtaining step for obtaining the raw fluid flow rate and, when a level measurement is available, a correcting step during which the obtained raw flow rate is corrected as a function of the level measurement.

A Kalman filter is a method of calculation that can be performed by a computer and that makes it possible to estimate the states of a dynamic system from an input data series that is incomplete or noisy. A Kalman filter is modelled by a state equation (1), which represents variation of the dynamic system, and by a measurement equation (2), which represents the relationship between measured observable magnitudes and the intrinsic state of the system. These equations are of the following type:

$$\begin{cases} x_{k+1} = f(x_k, u_k, w_k) & (1) \\ y_k = h(x_k, v_k) & (2) \end{cases}$$

where k is the current instant, k+1 is the following instant, x is the (intrinsic) state of the system, u is the input data, y is the (observed) measured magnitude, $f$ is the state function, h is the measurement function, and v and w are noise (respectively measurement noise and state noise). The variables x, y, u, v, and w, may all be vectors having one or more components. In order to implement a Kalman filter in a method of the invention, the state x comprises the fluid flow rate that is observed from the measurement y, which by way of example comprises the level of fluid in the tank. By way of example, the input data u comprises parameters of the system, such as the speed of a pump and/or the pressure of the fluid at one or more positions in the fluid circuit. The input data u may be estimated from measurements other than y, or it may be operating data of the system.

The Kalman filter comprises an obtaining step for obtaining a value of the state (k+1) following the current state (k) on the basis of input data $u_k$, and a correction step for correcting the value obtained from the measurement $y_k$. These steps are widely described in the literature and they are not explained again herein for the general situation.

An unscented Kalman filter (UKF), as described in "A new extension of the Kalman filter to nonlinear systems" (Julier and Uhlmann, in the $11^{th}$ international symposium on Aerospace/Defence sensing, simulation and controls, Vol. multi sensor fusion, tracking and resource management II, Orlando, Fla., 1997), is a variant of the Kalman filter that is particularly adapted to nonlinear systems as may apply to the flow rate of a fluid as a function of the level in the tank from which the fluid comes. In addition to the steps of a Kalman filter, and unscented Kalman filter includes a step referred to as the "unscented transformation", which consists in approximating the current state $x_k$ by a Gaussian random variable represented by a set of suitably chosen points referred to as sigma-points. This set of points accurately reproduces the mean and the covariance of the Gaussian random variable. During the obtaining step, the state equation (1) is applied to each of the sigma-points in order to obtain the following state. This gives rise to a set of sigma-points at the instant k+1, which points reproduce the mean and the covariance of the following state $x_{k+1}$ with accuracy that reaches the second order (in terms of a Taylor series analysis). In contrast, an extended Kalman filter, which is another variant of a Kalman filter used with nonlinear systems, achieves accuracy of the first order only. Furthermore, unlike an extended Kalman filter, a UKF does not require any costly explicit linearizing calculation (calculating Hessian or Jacobian matrices).

The obtaining step consists in an optionally provisional initial determination of the flow rate that it is desired to evaluate. It may be performed by measurement, by calculation (in particular by using the state equation (1) of the UKF), or by a combination of both. In other words, the state x of the UKF comprises the flow rate that it is desired to evaluate. The raw flow rate obtained by the obtaining step is then subjected to the correction step.

As mentioned above, the correction step makes use of the results of the measurement step. The measurement step does not assume that the level measurement is available continuously: it consists in verifying whether a measurement is available, and if so in taking it. If the measurement is not available at some instant, then the measurement step does not return any data to the correction step, and consequently the flow rate that is obtained at that instant is not corrected.

The evaluation method may be used to evaluate an instantaneous flow rate, an accumulated flow rate, or any other magnitude that is calculated on the basis of the flow rate.

The evaluation method thus provides an evaluation of the flow rate of the fluid that is accurate, consistent with the measurements of level in the tank, and that intrinsically corrects for the biases and errors of the obtaining step, as a result of using a UKF. Furthermore, the method is compatible with a tank of any shape, and in particular with tanks that are not cylindrical. Also, by using the UKF state equation, the obtaining step makes it possible to evaluate the flow rate of the fluid in a manner that is accurate, even when level measurements are not available. Finally, the method adapts well to variations in flow rate and to variations in the operating point of the system in which the flow rate is being measured.

In certain embodiments, the raw flow rate value is measured by at least one sensor, in particular a flowmeter. In these embodiments, the obtaining step is essentially performed by the flowmeter and the correction step serves to correct the flowmeter on the basis of the measured level values. When a flowmeter is present, the evaluation method thus makes it possible to make it reliable, to reset it, and/or to recalibrate it.

In certain embodiments, the raw flow rate value is calculated by mathematical estimation with iteratively evaluated coefficients, in particular by using an artificial neural network. The term "mathematical estimation with iteratively evaluated coefficients" is used to exclude physical measurements and mathematical expressions in which the coefficients are constants and known explicitly a priori. The coefficients that are evaluated iteratively may be evaluated in particular by successively adapting a model to a set of data, as is done by an artificial neural network, or by an equation that is solved numerically having a solution that converges.

An artificial neural network (ANN) is a calculation model comprising one or more neurons, each neuron being provided with a transfer function. An AAN thus possesses an overall transfer function suitable for calculating at least one output as a function of at least one input. The transfer functions of each neuron or the relative weights of the neurons in the network may be weighted by biases and by coefficients referred to as synaptic weights (or more simply as weights). The weights may be modulated as a function of training the AAN. Training consists in providing the AAN with a set of situations in which the inputs and the outputs are known. During training, the AAN adapts the biases and the synaptic weights so that they comply with the training situations, possibly with a certain amount of tolerance. AANs are thus mathematical expressions having coefficients that are adapted iteratively as a function of training. The biases and the weights, once they have been determined at the end of the stage of training, may optionally remain constant during the subsequent stage of operation.

An AAN is thus capable of intelligently modelling a system by learning from the real behavior of said system, without it being necessary to know the theoretical laws that govern it. An AAN also possesses the capacity to generalize (also known as "inference"), i.e. it is capable of determining the output values for a situation for which it has been given the input values, even if it has not been trained to that situation during the training stage, provided that the inputs are contained within a validity domain (in other words, it is ensured that the input values for the situation that is to be calculated lie between, or close to, the extreme input values that have been used for training). This is particularly useful for systems that present a wide range of operating points and for which, in an industrial situation, it is inconceivable to envisage setting the parameters explicitly for all possible situations. For better accuracy, it is necessary to verify that the training situations constitute a suitably fine mesh covering the operating domain. Finally, an AAN is a system that is easy to adapt. These advantages are also valid for other types of mathematical expression having coefficients that are evaluated iteratively.

Furthermore, in such implementations, the obtaining step is thus performed by a mathematical estimation, which makes it possible to omit the flowmeter and achieve savings in cost, in weight, and in bulk.

Unlike certain systems known elsewhere, in which an unscented Kalman filter is used to determine the synaptic weights of an AAN, the present method makes use of a mathematical expression having coefficients that are evaluated iteratively (in particular an AAN) by incorporating it in the obtaining step of the UKF. Its operation and purpose are thus entirely different.

In certain embodiments, the mass of fluid in the tank is a non-linear function of the level of fluid in the tank. In certain embodiments, the tank is not cylindrical. In certain other embodiments, the tank is a cylinder having generator lines that are not perpendicular to the mean level of the fluid in the tank.

It should be recalled that a cylinder is a surface defined by sweeping a straight line of fixed direction, referred to as a generator line, around a closed plane curve. The term "cylinder" is also used to designate a truncated cylinder, i.e. the solid that is defined by a cylinder and by two parallel planes, the planes not being parallel to the generator lines of the cylinder.

The above characteristics apply to the shape of most tanks, and in particular tanks having spherical end walls. When the tank is not cylindrical, the speed at which the tank empties (i.e. the derivative of the level as a function of time) is not an affine function of the outlet flow rate from the tank. As mentioned above, this nonlinearity is taken into account particularly well by a UKF In certain embodiments, a state of the unscented Kalman filter includes a bias of the raw flow rate value. In certain embodiments, it is assumed that the flow rate is equal to the sum of the raw flow rate obtained in the obtaining step plus a bias (which may be positive or negative). More generally, in other implementations, it is assumed that the flow rate is an affine function of the raw flow rate that is obtained, the bias then being a vector constituted by the coefficients of the affine function. The fact that the state of the Kalman filter includes the bias as such makes it possible to extract and use the value of the bias subsequently, e.g. in order to detect an anomaly when the value of the bias exceeds a certain threshold.

In certain embodiments, a state of the unscented Kalman filter includes the raw value of the flow rate and a bias of this value.

In certain embodiments, the evaluation method further includes a step of filtering fluctuations in the fluid level. Fluid level fluctuations are transient variations in the fluid level for a constant volume of fluid in the tank, as contrasted to changes in level resulting from the fluid flow rate. Fluctuations in fluid may be due to the fluid sloshing in the tank or to wideband noise in the signal (white noise associated essentially with interactions between the tank and its mechanical and hydraulic environment). By way of example, this filtering step may be performed with a lowpass filter or by the UKF including rejection of the resonant mode of the sloshing. For example, it is possible to write the fluid level in a form comprising a fluctuation function and to determine the coefficients of this fluctuation function (e.g. the amplitudes, frequencies, and phases of the main terms of its Fourier series analysis) by including these coefficients in the state vector of the UKF.

Such a filtering step serves to attenuate noise in the level measurements and to make the evaluation method even more reliable.

The present description also relates to a method of evaluating two flow rates of fluids coming respectively from a first tank and from a second tank, wherein the flow rates of the fluids are evaluated by separately implementing: a first evaluation method comprising a step of estimating the flow rates of the fluids using an unscented Kalman filter, in which no level measurement is taken into account in a step of correcting the unscented Kalman filter; a second method of the above proposed type, wherein only a level measurement of the first tank is taken into account; a third method of the above proposed type, wherein only a level measurement of the second tank is taken into account; and a fourth method of the above proposed type, wherein both level measurements are taken into account; and wherein the flow rates that are returned are the flow rates as evaluated by that one of the four methods that takes account exactly of the measurements that are available.

In the present method, it is desired to evaluate two flow rates of values that are corrected on the basis of two level measurements. Both level measurements may be available simultaneously, both measurements may be unavailable simultaneously, or only one or the other of the two measurements may be available. There are thus four level measurement availability situations.

The idea of such a method is to evaluate the two flow rates using four variants of the above-described method, and then to select the variant that is the most appropriate for the level measurements that are available. The four methods differ in that they take account of some, all, or none of the level measurements that are returned by the measurement step. Each of the four methods can thus be optimized as a function of the measurements that it is suitable for taking into account.

Among the four methods used, the method retained is the method that takes account exactly of the measurements that are available, i.e. the method that, at the instant under consideration, takes account of the measurements being returned by the measurement step and does not take account of the measurements that are not being returned by the measurement step. This selection thus consists in selecting the method that is the best adapted to the situation under consideration. Selection from among the four methods may be performed before, after, or during application of the methods. Also, this method can be generalized to a greater number of flow rates and/or of measurement availability situations.

The present description also provides an evaluation system for evaluating a flow rate of a fluid coming from a tank, the system comprising measurement means suitable for measuring a fluid level in the tank and being characterized in that it includes estimation means for estimating the flow rate of the fluid using an unscented Kalman filter, said estimation means comprising obtaining means for obtaining the raw fluid flow rate and correction means connected to the obtaining means and to the measurement means and configured to correct the raw flow rate as obtained by the obtaining means as a function of the level measured by the measurement means. Such a system is particularly suitable for performing the above-described method.

The present description also provides a propulsion system, in particular for a space launcher, the system comprising two tanks, each containing a propellant, a combustion chamber into which the two propellants are injected, and an evaluation system as described above for evaluating the flow rate of at least one of the propellants. For a propulsion system, it is particularly important to estimate propellant flow rates correctly. Also, a lightening of mass and an increase in compactness due to omitting flowmeters likewise constitute looked-for savings.

If such a propulsion system has a system for evaluating two flow rates, or a system for evaluating each of the flow rates, it is possible to calculate the mixture ratio of the propellants, i.e. the ratio of the propellant flow rates at the inlet to the combustion chamber. The mixture ratio of two propellants is an important parameter for controlling the propulsion system.

The present description also relates to a program including instructions for executing steps of the evaluation method according to any of the above described implementations when said program is executed by a computer.

In a particular implementation, the various steps of the evaluation method are determined by computer program instructions.

The program may use any programming language, and may be in the form of source code, object code, or code intermediate between source code and object code, such as in a partially compiled form, or in any other desirable form.

The present description also provides a computer-readable data medium storing a computer program including instructions for executing steps of the evaluation method according to any of the above described implementations.

The data medium may be any entity or device capable of storing the program. For example, the medium may comprise storage means, such as a read only memory (ROM), for example a compact disk (CD) ROM or a microelectronic circuit ROM, or indeed magnetic recording means, for example a floppy disk or a hard disk.

Furthermore, the data medium may be a transmissible medium such as an electrical or optical signal that can be conveyed via an electrical or optical cable, by radio, or by other means. The program of the invention may in particular be downloaded from a network of the Internet type.

BRIEF DESCRIPTION OF THE DRAWINGS

The invention and its advantages can be better understood on reading the following detailed description of implementations of the invention given as non-limiting examples. The description refers to the accompanying drawings, in which.

DETAILED DESCRIPTION OF THE INVENTION

Figure 1:
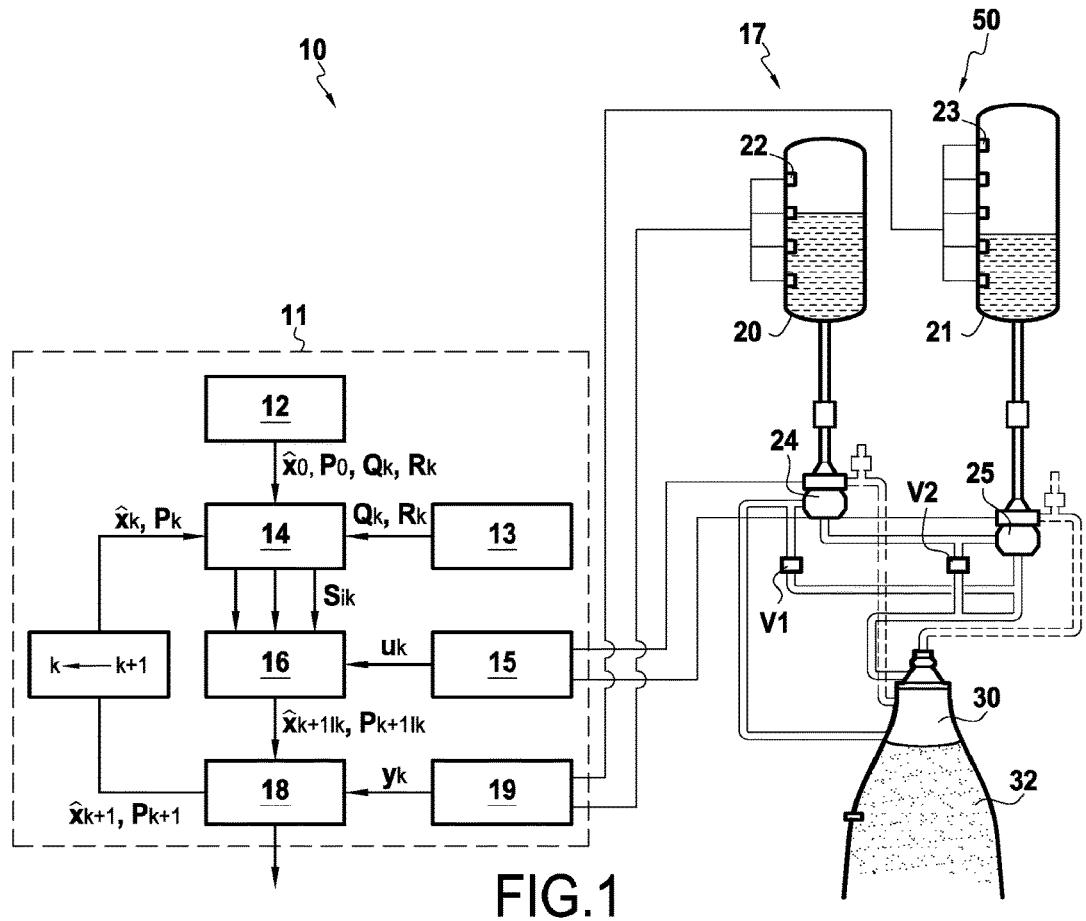
FIG. 1 shows a propulsion systems fitted with a first embodiment of a flow rate evaluation system.

FIG. 1 shows a propulsion system 50, in particular for a space launcher, comprising two tanks 20 and 21, each containing a propellant (e.g. respectively liquid hydrogen and liquid oxygen), a combustion chamber 30 into which the two propellants are injected, and a system 10 for evaluating the flow rate, of the propellants at the inlet to the combustion chamber 30. The combustion gas develops thrust on being ejected via a nozzle 32 downstream from the combustion chamber 30.

Specifically, the propulsion system 50 is an integrated flow system in which the heated propellant (e.g. hydrogen) drives turbopumps 24 and 25 prior to being reinjected into the combustion chamber 30. Two regulation valves V1 and V2 serve to modulate the flow rate of heated propellant entering the turbines of the turbopumps 24 and 25 so as to control the flow rate of liquid propellants pumped by these turbopumps 24 and 25.

Figure 2:
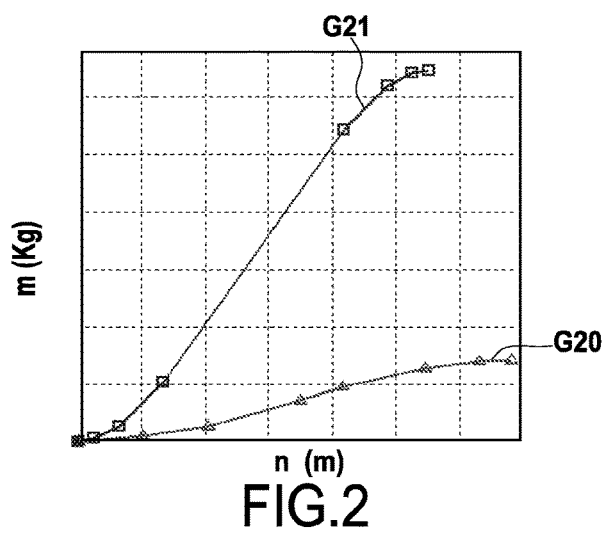
FIG. 2 plots the mass of propellant contained in the tanks of the FIG. 1 propulsion system as a function of level.

As can be seen in FIG. 1, the tanks 20 and 21 are non-cylindrical tanks. More particularly, in the example shown, they are tanks with spherical ends. As a result, the relationship between the level of propellant in each tank and the mass of propellant in said tank is not linear. Specifically, an example of such a relationship is given in FIG. 2. Curve G20 (or curve G21 as the case may be) plots the mass m of propellant in the tank 20 (or in the tank 21) as a function of the level n of propellant in the same tank. Each of these curves G20 and G21 includes a substantially linear central portion (corresponding to a substantially cylindrical central portion of the tank). For the highest levels or the lowest levels, the curves are flattened, which means that the tanks are narrower compared with their central portions. This appearance of the curves is characteristic of the ends of the tanks having a shape that is hemispherical or the like. In the present example, the non-linearity of the relationship between propellant flow rate at the inlet to the combustion chamber 30 and the level of propellant in the tanks 20, 21 comes not only from the shape of the tanks (geometrical non-linearity) as explained above, but also from a second non-linearity associated with flow rate being expressed as a function of the operating parameters of the propulsion system (mechanical and thermodynamic non-linearities).

As shown in FIG. 1, the tanks 20 and 21 have respective level probes 22 and 23 for measuring the level in each tank. The size and the shape of the tanks and the configuration of the level probes 22 and 23 may vary from one tank to another. Each level probe 22, 23 consists of a set of sensors. These sensors return a signal that can be taken into account only while they are being uncovered, i.e. while they are at least partially above the free surface of the propellant contained in the tank. For example, curves showing the availability of the level probes 22 and 23 as a function of time t during operation of the propulsion system 50 are plotted respectively in FIGS. 3A and 3B. Since the tanks 20 and 21 empty at different speeds, the availability curves for the level probes 22 and 23 are generally different. Availability has value 1 when the level probe is in the process of being uncovered and is capable of sending a measurement; otherwise availability has the value 0.

Figure 3A:
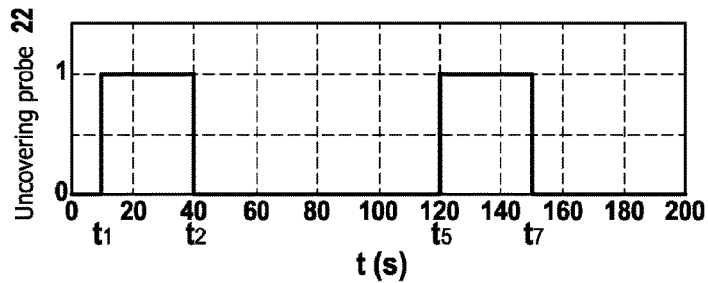
FIGS. 3A and 3B show the availability of measurements from the level probes in the tanks as a function of time.

As shown in FIG. 3A, the level probe 22 is made up of a plurality of segments and it is in the process of being uncovered between t1=10 seconds (s) and t2=40 s and also between t5=120 s and t7=150 s. During the remainder of the time, its availability is zero, i.e. the level probe 22 does not return any measurement: the level of propellant lies between two consecutive sensors.

Figure 3B:
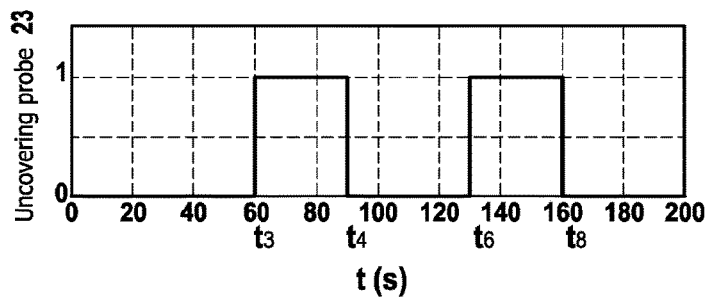

In analogous manner, as shown in FIG. 3B, the level probe 23 is in the process of being uncovered firstly between t3=60 s and t4=90 s and secondly between t6=130 s and t8=160 s. During the remainder of the time, the level probe 23 is not available.

It can be seen from FIGS. 3A and 3B that the level probes 22 and 23 provide measurements intermittently. Furthermore, the periods of availability of the level probes 22 and 23 do not necessarily coincide. The first period during which the level probe 22 is in the process of being uncovered, from t1 to t2, is completely separate from the first period during which the level probe 23 is in the process of being uncovered, from t3 to t4, whereas the second period during which the level probe 22 is in the process of being uncovered, from t5 to t7, overlaps the second period during which the level probe 23 is in the process of being uncovered, from t6 to t8, for a period of ten seconds from t6 to t7. It is thus possible that the measurements supplied by the level probes 22 and 23 are not available simultaneously.

The level probes 22 and 23 are connected to a flow rate evaluation system 10, as shown in FIG. 1. As mentioned above, the evaluation system 10 has measurement means 17 suitable for measuring the level of fluid in the tank. The measurement means 17 comprise the level probes 22 and 23 and an acquisition card 19 to which they are connected.

The evaluation system 10 has means for estimating the flow rate of each propellant by using an unscented Kalman filter. These are calculation means comprising in particular a computer 11 that of which the acquisition card 19 is part. Specifically, the estimation means comprise an initialization device 12, a transformation device 14, an obtaining device 16, and a correction device 18. In addition to the level measurements collected by the measurement means 17, the evaluation system 10 makes use as input data of data about the operation of the propulsion system 50. For example, there can be seen an acquisition device 15 connected to the turbopumps 24 and 25 so as to receive data about the speeds of rotation of the turbopumps and the pressures of the propellants at the outlets from the turbopumps. Other data may also be collected. Furthermore, the acquisition device 15 may be connected to other components or locations of the propulsion system 50 in order to acquire other data. For example, it may also be connected to the combustion chamber 30 to measure the pressure of the gas in the combustion chamber 30.

An unscented Kalman filter is an iterative filter, each new estimate being calculated on the basis of the preceding estimate and of current data. The values returned by the correction device 18 serve both as input values to the transformation system 14, thus providing the iterative operation of the evaluation system 10, and also as overall output values. These output values may be used for various purposes, e.g. for monitoring the operation of the engine or for regulating the engine, in particular for adjusting the opening of the bypass valves V1 and V2 as a function of the evaluated flow rates.

In FIG. 1, where k is the current instant (or the current iteration), the following notation is used:

$x_k$ the current state, $\hat{x}_k$ an estimate of its mean value, and $P_k$ its covariance matrix;

$Q_k$ and $R_k$ the covariance matrices respectively of the state noise $w_k$ and of the measurement noise $v_k$ of the Kalman filter (cf. above-described equations (1) and (2)), that are assumed to be known a priori, knowing that the measurement noise can be measured;

$S_{ik}$ the $i^{th}$ sigma point at instant k;

$u_k$ the input data;

$\hat{x}_{(k+1|k)}$ the raw value of the state x obtained at instant k+1, knowing the same value as instant k;

$P_{(k+1|k)}$ the raw covariance matrix of the state x at the instant k+1 knowing the covariance matrix $P_k$;

$y_k$ the measured values from the measurement means 17; and $\hat{x}_{k+1}$ the value of the state x at instant k+1 corrected as a function of the level measurements measured by the measurement means 17, and $P_{k+1}$ its covariance matrix.

The state $x_k$ of the unscented Kalman filter selected in the present embodiment comprises the fuel level $n_k$, the flow rate $q_k$ estimated by the ANN, and the bias $E_k$ of the flow rate. This gives:

$$x_k = [n_k, q_k, E_k]^T \quad (5)$$

The state of the UKF may have as many levels, flow rates, and biases as the number of flow rates that it is desired to evaluate using the UKF. In the example of FIG. 1, the magnitudes n, q, and E are vectors, each having two components, one of which refers to the propellant of the tank 20 and the other to the propellant of the tank 21. For reasons of clarity, and unless mentioned to the contrary, the description below relates to only one flow rate, however the elements described are equally valid when there is more than one flow rate.

The initialization device 12 is configured to supply the transformation device 14 with an initial state $\hat{x}_0$, $P_0$, which is a function of the characteristics of the propulsion system 50.

The transformation device 14 is configured to perform the unscented transformation of the UKF at each instant k, i.e. to create a set of sigma points $S_{ik}$ from the value $\hat{x}_k$ and the covariance matrix $P_k$ approximating the current state $x_k$.

The obtaining device 16 is configured to perform the obtaining step of the evaluation method. In the present implementation, the obtaining step is implemented by an artificial neural network. This ANN provides the raw propellant flow rates at the inlets of the corresponding turbopumps 24 and 25 taking as its inputs the pressures of said propellants at the outlet from the pumps, the gas pressure in the combustion chamber 30, and/or the speed of rotation of said turbopumps. Other things being equal, the greater the amount of input data (giving a corresponding number of situation-discriminating criteria), the more accurate the estimate supplied by the ANN. In particular, the ANN may be of the multi-layer perceptron type, in particular having a single hidden layer for the various sets of inputs, being established on the basis of a database corresponding to a map obtained from experimental data or from physical models.

Empirically, it is found that the flow rate supplied at the output of the ANN is noisy. In this implementation, a lowpass filter is applied thereto, specifically a first order filter. By writing $q_k$ for the flow rate obtained by the obtaining device 16 at instant k, $ANN_k$ for the function applied by the ANN to the input data $u_k$, $\Delta t$ for the time step between k and k+1, and T for the time constant of the filter (of the order of one second in this example), an example of such a filter is an expression of the following type:

$$q_{k+1} = e^{-\frac{\Delta t}{T}} \times q_k + (1 - e^{-\frac{\Delta t}{T}}) \times ANN_k(u_k) \quad (3)$$

It is also assumed that the flow rate d is the sum of the raw flow rate q returned by the ANN plus an unknown bias E, which may be positive or negative, representing the effects of errors in modeling the flow rate. In other words, for each propellant, the following relationship applies:

$$d_k = q_k + E_k \quad (4)$$

In other implementations, equation (4) may be generalized in the following form:

$$d_k = E_k^1 q_k + E_k^2$$

in which the bias E is a vector and is applied to the flow rate in the form of an affined function. In particular, the coefficient $E_k^1$ makes it possible to take account of a multiplicative bias, while the coefficient $E_k^2$ serves to take account of an additive bias. In the above first example of equation (4), $$E_k^1 = 1 \text{ and } E_k^2 E = E_k.$$

For the obtaining device 16, it is assumed that the bias E is constant; this does not prevent the bias E from being corrected subsequently by the correction device 18. This assumption can be expressed by the following relationship:

$$E_{k+1} = E_k \quad (5)$$

Other types of relationship for variation in the bias $E_k$ are possible for the obtaining device 16, for example bias that is proportional to the thrust of the propulsion system 50, or indeed bias that increases as a function of the square of the distance from the nominal operating point at which it can be assumed that the bias is at its smallest (since the system at that point is best known by definition). Thus, equations (3), (4), and (5) define equations for variation in the flow rate relying on the ANN implemented in the obtaining device 16.

Furthermore, the obtaining device 16 also has a model for variation in the fuel levels $n_k$ in the tanks. By writing that the mass of fuel $m_k$ decreases at each time step $\Delta t$ by a quantity $\Delta t \times d_k$ and that the mass is associated with level by the functions G20 and G21 (cf. FIG. 2; these functions are referred to below generically by the letter G), then the following relationship is obtained for each propellant:

$$n_{k+1} = G(G^{-1}(n_k) - \Delta t \times (q_k + E_k)) \quad (6)$$

where $G^{-1}$ is the inverse of the function G.

The operation of the evaluation device 10 is described below in detail. The initialization device 12 initializes the initial state $x_0$, e.g. taking the initial filling level of the tanks, a flow rate of zero, and a bias of zero. The initialization device 12 supplies the transformation device 14 with the values $\hat{x}_0$, $P_0$ corresponding to the initial state. For this calculation, the state x is assumed to be a random Gaussian variable of means $\hat{x}$ and of covariance P.

At each iteration k, the transformation device 14 calculates an enlarged state vector $$X_k = [x_k v_k w_k]^T$$

Its covariance matrix $P_{Xk}$ is the block diagonal matrix formed by the respective covariance matrices $P_k$, $Q_k$, and $R_k$. The covariance matrices $Q_k$, $R_k$ are obtained empirically and stored in a memory 13. Alternatively, or in addition, the measurement covariances $R_k$ may be calculated automatically by estimating the variances of measurement noise $v_k$ over a moving time window.

The transformation device 14 generates a set of sigma points corresponding to the Gaussian random variable $\hat{X}_k$, $P_{Xk}$ that approximate the current state $X_k$. The sigma points $S_{ik}$ are generated using the conventional unscented Kalman filter technique, which is not described in detail herein. Each sigma point $S_{ik}$, which has the same structure as the vector $\hat{X}_k$, is supplied to the obtaining device 16.

The role of the obtaining device 16 is to obtain an initial estimate (raw value) of the state vector at instant k+1, knowing an estimate for that vector at instant k, and data about the propulsion system 50 (specifically the input data $u_k$). As mentioned above, this obtaining is performed using equations (3), (4), (5), and (6) which make use of an ANN. Insofar as the ANN is a predictive model, the obtaining step may be referred to herein more particularly as a prediction step. The variations in noise $v_k$ and $w_k$ are determined using the conventional methods that are employed when using an unscented Kalman filter. For the state noise, in the specific situation when use is being made of a model that has been constructed (such as an ANN), it is possible to compare the results of the model with known situations in order to obtain a map showing the accuracy of the ANN in its domain of validity.

The values of the sigma points $S_{ik+1}$ at instant k+1, supplied by the ANN are then used to determine at the output of the obtaining device 16 a (predicted) obtained value $\hat{x}_{(k+1|k)}$ for the state x at the instant k+1, knowing the value $\hat{x}_k$ at the instant k, and the covariance matrix $P_{(k+1|k)}$ of the state x that the instant k+1, knowing the covariance matrix $P_k$. As shown in FIG. 1, these values are then supplied to the correction device 18.

The correction device 18 then corrects the values obtained by the obtaining device 16 when measurements are available. For each propellant, if the level measurement is available (i.e. if the corresponding level probe is being uncovered), the state value $x_{k+1}$ is corrected as a function of the difference between the measured level $y_k$ and the predicted level (the level that has been obtained) $\hat{y}_k$. The state value is corrected in particular by a value proportional to said difference, the proportionality factor being referred to as the "Kalman gain". The Kalman gain is calculated in conventional manner from sigma points and from the level measurement. Otherwise, if the level measurement is not available, it is the state value $x_{k+1}$ as determined using equation (6) by the obtaining device 16 that is retained, e.g. by setting the Kalman gain to zero. Depending on whether no, one, or two level measurements are available (four possible situations), the correction device 18 corrects the flow rates obtained by the obtaining device 16 accordingly. The correction device 18 thus has an incorporated selection function that adapts to the measurements that are available.

Figure 5:
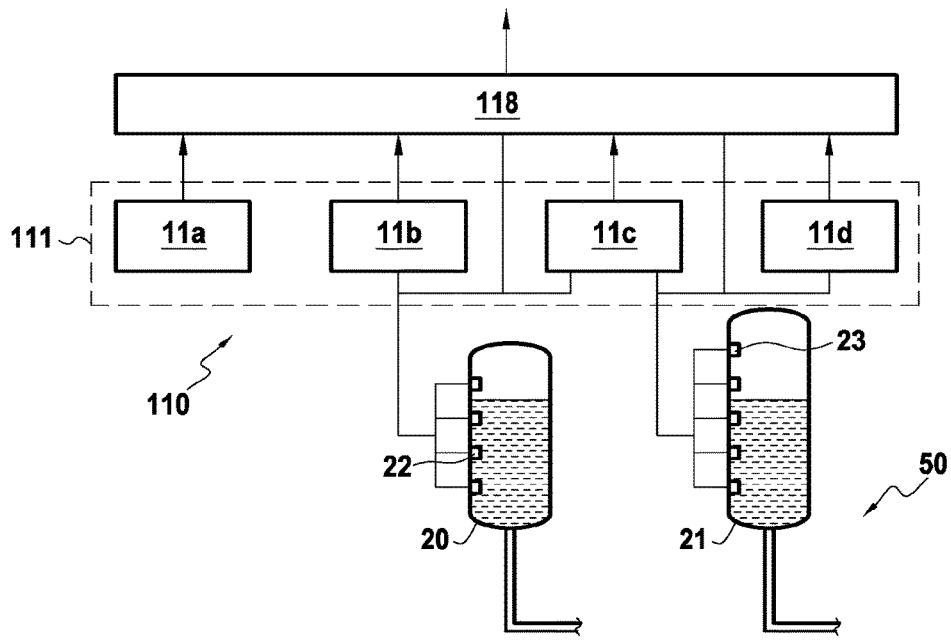
FIG. 5 shows a propulsion system fitted with a second embodiment of a flow rate evaluation system.

A variant is shown in FIG. 5, in which distinguishing between measurement-availability situations is performed by arranging four calculation functions 11a, 11b, 11c, and 11d in parallel in the evaluation system 110, which functions are incorporated in a calculation unit 111 and each of which is set to cover one of the four above-mentioned measurement-availability situations. In FIG. 5, unchanged portions of the propulsion system 50 (in particular the propulsion chamber 30 and the inputs to the calculation unit) are not shown. In addition, each calculation function 11a, 1b, 11c, and 11d has an architecture that is similar to that incorporated in the computer 11.

The calculation function 11a evaluates the fluid flow rates coming from the tanks 20 and 21 without taking account of level measurements. The correction device 18 provided within the calculation unit 11a is thus not used. The calculation function 11b evaluates the flow rates of fluid from the tanks 20 and 21 while taking account only of measurements returned by the level probe 22, when such measurements are available. In similar manner, the calculation function 11d evaluates the fluid flows from the tanks 20 and 21 while taking account only of the measurements returned by the level probe 23, when they are available. Finally, the calculation function 11c evaluates the flow rates of fluid from the tanks 20 and 21 by taking account of measurements returned by both of the level probes 22 and 23, when available.

The flow rate values evaluated by the calculation functions 11a, 11b, 11c, and 11d are transmitted to a selection device 118. The selection device 118 is also connected to the level probes 22 and 23 in order to know when they are available. The selection device 118 thus makes a selection from among the four sets of flow rates it has received, as a function of the availability of measurements returned by the level probes 22 and 23. At its output, the selection device 118 returns the set of flow rates supplied by the calculation unit that takes account exactly those measurements that are available. For example, if only the measurement returned by the level probe 22 is available, then the correction device 118 forwards the set of flow rates received from the calculation unit 11b.

In a variant, the selection device 118 may be upstream from or even at the same level as the calculation functions 11a, 11b, 11c, and 11d.

Under all circumstances, the evaluation system 10, 110 thus serves to reset the value obtained by the obtaining device 16 on the basis of measurements that are discontinuous and asynchronous.

The method performed by the evaluation system 10 enables flow rates to be evaluated instant by instant. As can be seen in FIG. 1, in order to evaluate successive flow rates, a recurrence loop makes it possible to pass to the following instant and to reiterate the above-described steps. At each step, the evaluated propellant flow rate, i.e. the obtained and then corrected flow rate is:

$$\hat{d}_k = \hat{q}_k + \hat{E}_k$$

in which relationship the estimated raw flow rate $\hat{q}_k$ is determined essentially by the ANN and the estimated bias $\hat{E}_k$ is determined essentially by the UKF.

Figure 4A:
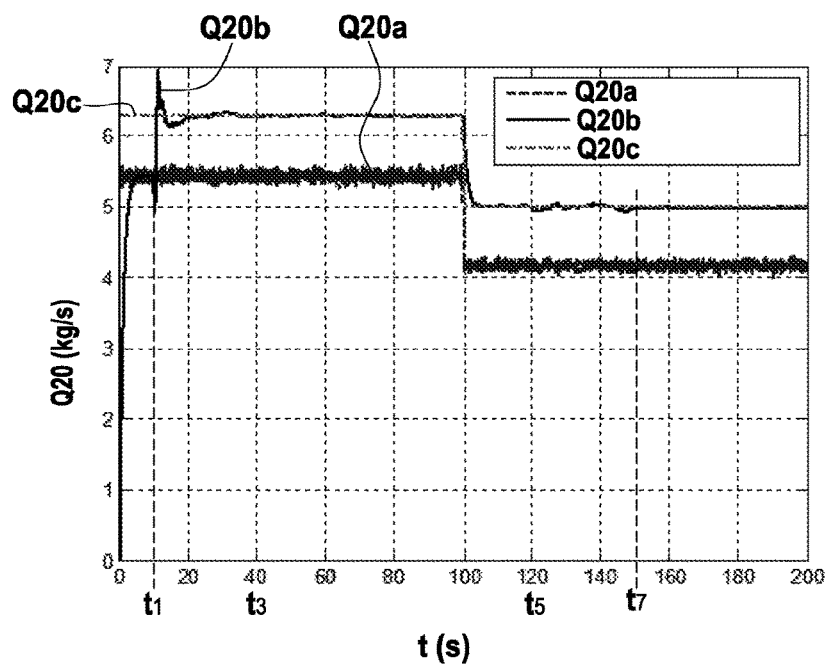
FIGS. 4A to 4C show the application of the FIG. 1 flow rate evaluation system.
Figure 4B:
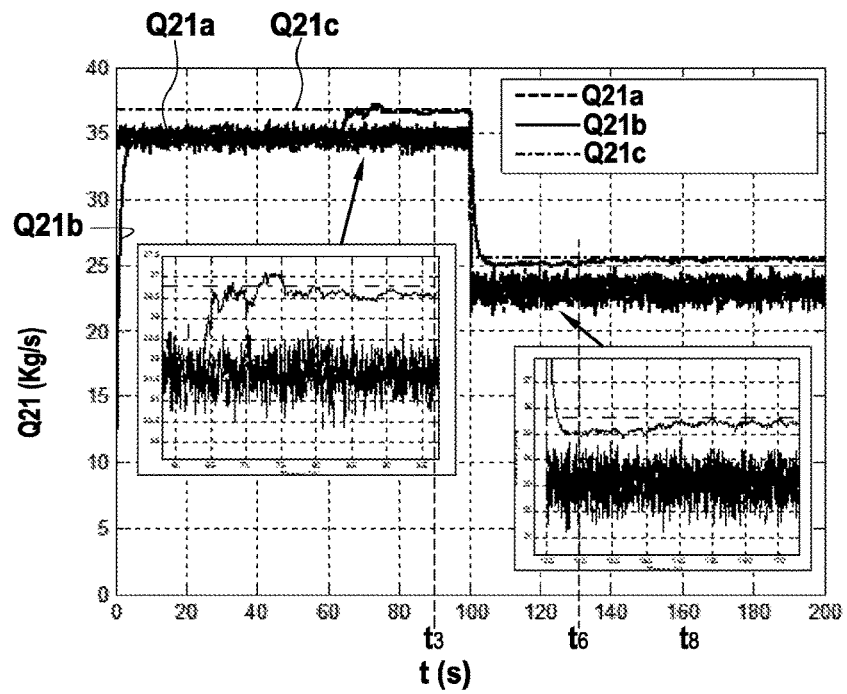
Figure 4C:
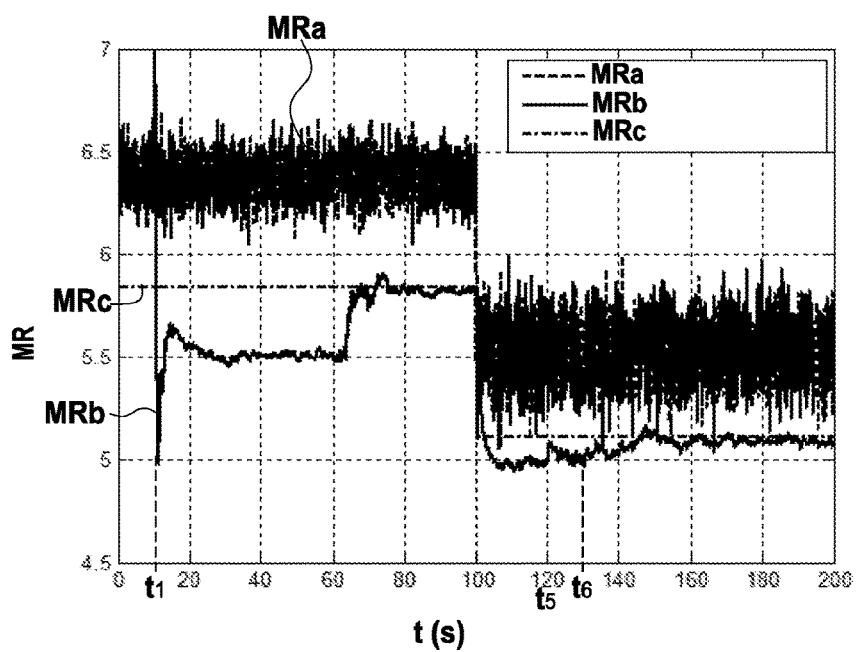

An application example is described below with reference to FIGS. 3A-3B and 4A-4C. FIGS. 4A-4C show the operation of the propulsion system 50 during two stages (two operating points) each lasting one hundred seconds. FIG. 4A shows variation in the propellant flow rate coming from the tank 20 and entering the combustion chamber 30, as estimated by the ANN alone (curve Q20a) and by the evaluation device 10 (curve Q20b). By way of comparison, the real value of the flow rate is also plotted (curve Q20c). As can be seen in FIG. 4A, during the initial seconds, the flow rate estimated by the ANN alone (curve Q20a) is closer to the real flow rate (curve Q20c) than is the flow rate estimated by the evaluation device (curve Q20b). This is due to the arbitrary nature of the values supplied by the initialization device 12. After a few seconds, this difference is absorbed.

At instant t=t1 (10 s), as shown in FIG. 4A, the level probe 22 is being uncovered and the measurement means 17 acquire level measurements. On the basis of these measurements, the correction device 18 can thus correct the values supplied by the obtaining device 16. This leads to a transient regime in the curve Q20b, followed by the evaluated flow rate stabilizing at a level that is close to the real flow rate (curve Q20c). The level probe 22 continues to be uncovered until t=t3 (40 s) after which it is once more unavailable. Between t3 and t5, the evaluated flow rate as represented by curve Q20b is evaluated solely by using the obtaining device 16, since the correction device 18 does not perform any action. It can be seen that, as from the first resetting on the basis of measurements, and in particular on either side of the change in operating point (t=100 s), the flow rate evaluated by the evaluation device 10 follows the real flow rate (curve Q20c) with great accuracy, while the flow rate evaluated by an ANN alone (curve Q20a) continues to maintain a bias or offset that is more or less constant relative to the real flow rate.

FIG. 4B is analogous to FIG. 4A and shows variation in the flow rate of propellant coming from the tank 21 and entering the combustion chamber 30. The curve Q21a shows the flow rate estimated by an ANN alone, the curve Q21b shows the flow rate evaluated by the evaluation device 10, and the curve Q21c shows the real flow rate. It can be seen that the curve Q21b follows the curve Q21a so long as the correction device is not effective (cf. FIG. 3B: up to t=t3, 60 s, the level probe 23 does not return any measurement). Thereafter, the curve Q21b comes substantially closer to the curve Q21c. The right-hand enlargement in FIG. 4B reveals a similar effect taking place during the second uncovering of the level probe 23, i.e. between t6 (130 s) and t8 (160 s). The use of an unscented Kalman filter thus significantly improves the results that can be provided by an estimator alone, in particular an ANN type estimator.

FIG. 4C shows the variation in the mixing ratio as a function of time. The mixing ratio is defined as the ratio between the flow rates of the two propellants. Each curve MRz is obtained by taking the ratio Q21z/Q20z, where z is equal to a, b, or c. The mixing ratio is a magnitude that is often used for regulating the operating point of a propulsion system such as the propulsion system 50.

The variation in the curve MRb showing the mixing ratio calculated from the flow rates evaluated by the evaluation device 10 clearly shows the respective resetting of each of the flow rates at instants t1 and t3 and then at instants t5 and t6. The evaluation device 10 thus provides an accurate estimate of the mixing ratio by virtue of the successive resetting operations made possible by the unscented Kalman filter.

Figure 6:
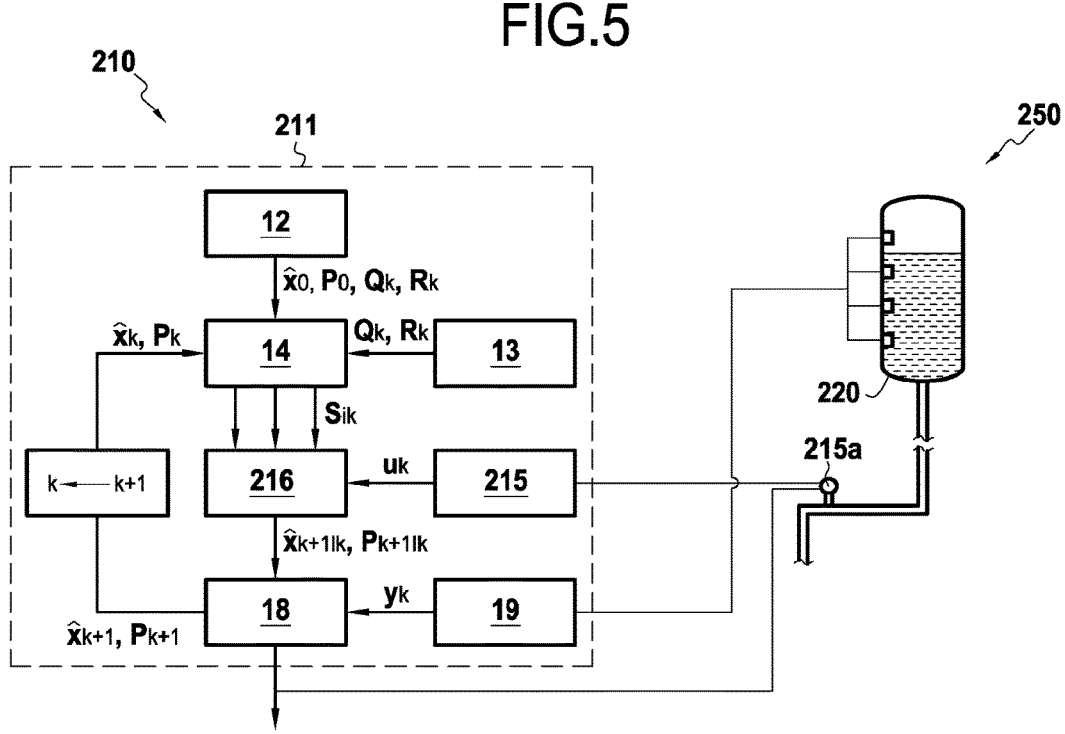
FIG. 6 shows a fluid circuit fitted with a third embodiment of a flow rate evaluation system.

FIG. 6 shows another embodiment of a device 210 for evaluating fluid flow rate. In this figure, elements that correspond to or are identical with elements of the first embodiment are given the same reference signs, with a different hundreds digit, and they are not described again.

The evaluation device 210 of FIG. 6 is incorporated within a fluid circuit 250 having a tank 220 from which a fluid flows. Downstream from the tank, a flow meter 215a measures the flow rate of the fluid. Nevertheless, the flow meter 215a may be inaccurate or biased. The role of the device 210 is to correct the value of the flow rate returned by the flow meter 215a on the basis of measurements of the level of fluid in the tank 220.

The evaluation device 210 operates by like the evaluation device 10 except that it makes use of the measurements returned by the flow meter 215a instead of relying on a predictive mathematical estimator such as an ANN. In other words, in above equation (3), the term $ANN_k(u_k)$ is replaced by the current value measured by the flow meter 215a and acquired by the acquisition device 215. The flow rate value obtained by the obtaining device 216 is then supplied to the correction device 18 which corrects it as a function of measurement $y_k$ received from the acquisition card 19. As shown in FIG. 6, the corrected evaluated flow rate is returned to the flow meter 215a by the evaluation device 210 so as to modify the calibration of the flow meter in order to reduce its measurement bias.

Although the present invention is described with reference to specific embodiments, modifications may be adopted to these embodiments without going beyond the general ambit of the invention as defined by the claims. In particular, individual characteristics of the various embodiments shown and/or mentioned may be combined in additional embodiments. Consequently, the description and the drawings should be considered in a sense that is illustrative rather than restrictive.

The invention claimed is:

1. An evaluation method for evaluating a flow rate of a fluid coming from a tank, the method comprising:
   measuring a level of the fluid in the tank; and
   estimating the flow rate of the fluid by using an unscented Kalman filter, said estimating comprising obtaining a raw fluid flow rate value and, when a level measurement is available, correcting the obtained raw flow rate value as a function of the level measurement.

2. The evaluation method according to claim 1, wherein the raw flow rate value is measured by at least one sensor.

3. The evaluation method according to claim 2, wherein the at least one sensor is a flowmeter.

4. The evaluation method according to claim 1, wherein the raw flow rate value is calculated by mathematical estimation with iteratively evaluated coefficients.

5. The evaluation method according to claim 4, wherein the raw flow rate value is calculated using an artificial neural network.

6. The evaluation method according to claim 1, wherein the mass of fluid in the tank is a non-linear function of the level of fluid in the tank.

7. The evaluation method according to claim 1, wherein a state of the unscented Kalman filter includes a bias of the raw flow rate value.

8. The evaluation method according to claim 1, further comprising, before said correcting, filtering fluctuations in the level measurement.

9. A non-transitory computer-readable data medium storing a computer program including instructions for executing steps of the evaluation method according to claim 1.

10. The evaluation method according to claim 1, wherein the tank is non-cylindrical.

11. A method of evaluating two flow rates of fluids coming respectively from a first tank and from a second tank, wherein the flow rates of the fluids are evaluated by separately implementing:
   a first evaluation method comprising estimating the flow rates of the fluids using an unscented Kalman filter, in which no level measurement is taken into account in a step of correcting the unscented Kalman filter;
   a second method according to claim 1, wherein only a level measurement of the first tank is taken into account;
   a third method wherein only a level measurement of the second tank is taken into account; and
   a fourth method wherein both level measurements are taken into account; and
   returning the flow rates as evaluated by that one of the four methods that takes account exactly of the measurements that are available.

12. An evaluation system for evaluating a flow rate of a fluid coming from a tank, the system comprising:
   a detector suitable for measuring a fluid level in the tank; and
   circuitry configured to estimate a flow rate of the fluid using an unscented Kalman filter by obtaining the raw fluid flow rate and correcting the obtained raw flow rate as a function of the level measured by the detector.

13. A propulsion system comprising:
   two tanks, each tank containing a propellant;
   a combustion chamber into which the two propellants are injected; and
   an evaluation system for evaluating the flow rate of at least one of the propellants according to claim 12.

14. A system for resetting a flowmeter, the system comprising an evaluation system according to claim 12 in order to evaluate the flow rate passing through the flowmeter.

15. The evaluation system according to claim 12, wherein the tank is non-cylindrical.

* * * * *